T. ISONO.
INDUCTION MOTOR.
APPLICATION FILED MAY 24, 1919.
1,396,579.
Patented Nov. 8, 1921.
2 SHEETS—SHEET 1.
Fig. 1.
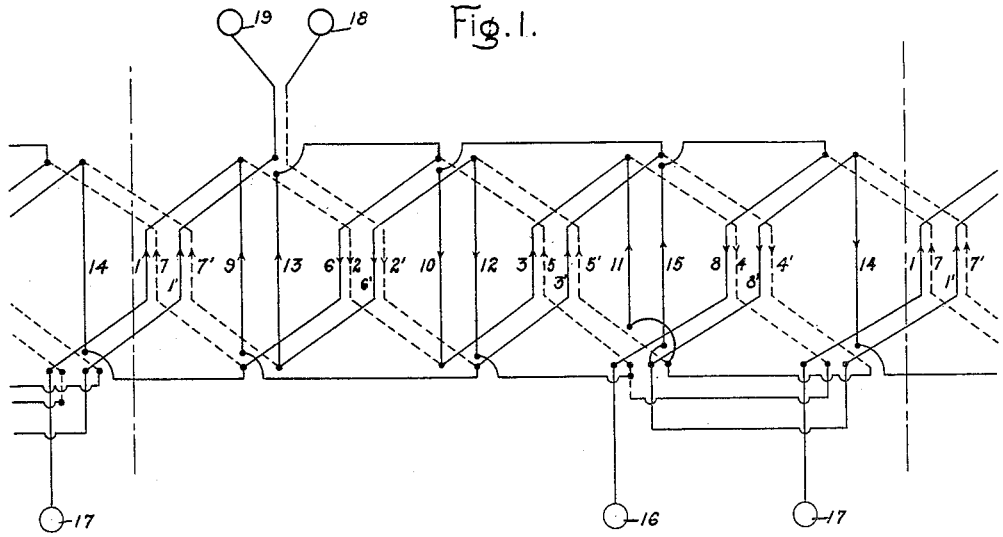
Fig. 2.
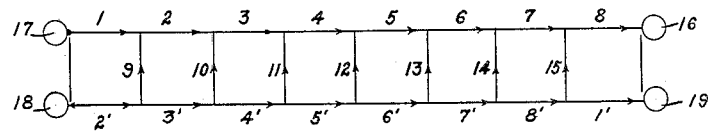
Fig. 3.
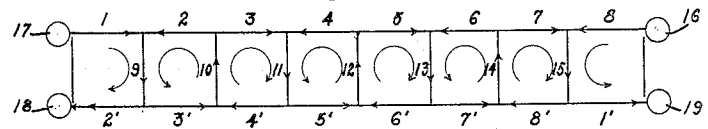
Fig. 4.
Fig. 5.
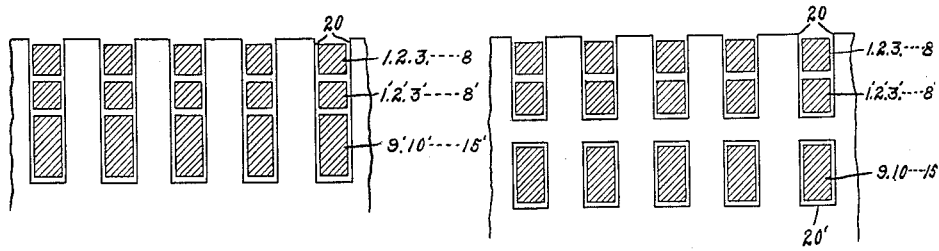
Inventor:
Tatsuichiro Isono,
by Albert G. Davis
His Attorney.

Inventor:
Tatsuichiro Isono.
His Attorney.

UNITED STATES PATENT OFFICE.

TATSUICHIRO ISONO, OF TOKYO, JAPAN, ASSIGNOR TO GENERAL ELECTRIC COMPANY, A CORPORATION OF NEW YORK.

INDUCTION-MOTOR.

1,396,579.   Specification of Letters Patent.   Patented Nov. 8, 1921.

Application filed May 24, 1919. Serial No. 299,556.

*To all whom it may concern:*

Be it known that I, TATSUICHIRO ISONO, a subject of the Japanese Empire, residing at Tokyo, Japan, have invented certain new and useful Improvements in Induction-Motors, of which the following is a specification.

My invention relates to induction motors. Speaking broadly, the secondary winding of the motor of my invention consists of a combination of a wound secondary and a cage secondary, whereby in the same machine it is possible to both increase the starting torque (as by closing the secondary winding through a resistance) and change speed by changing the number of magnetic poles. An object of my invention is to provide a simple construction having the characteristics of a wound secondary and of a cage secondary.

Figure 6:
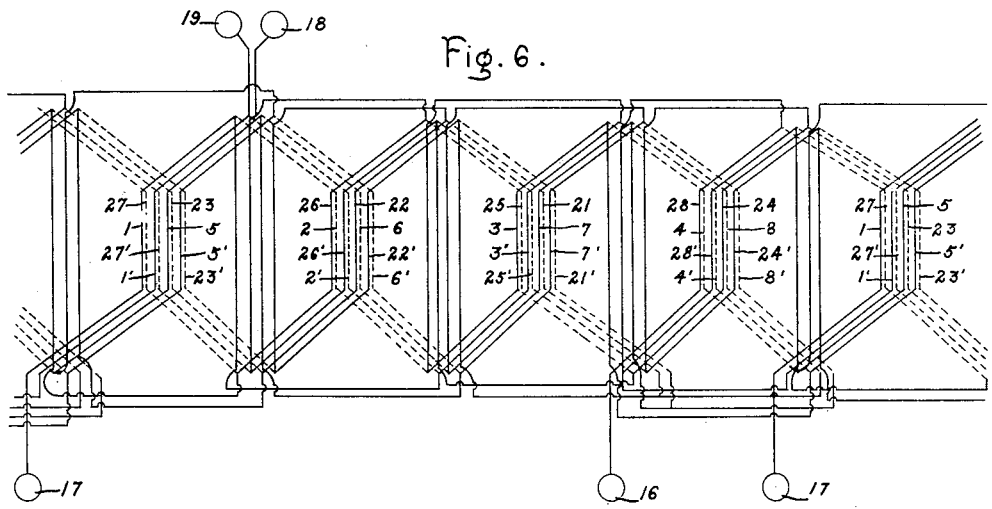
Figure 7:
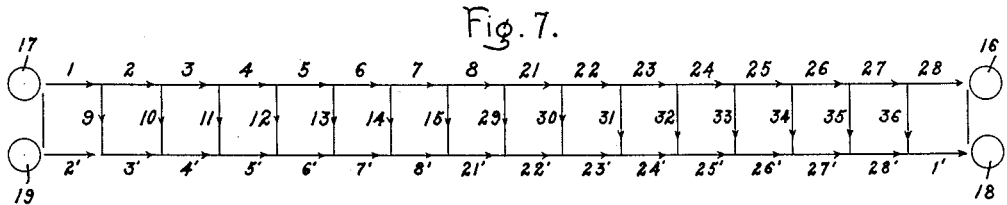
Figure 8:
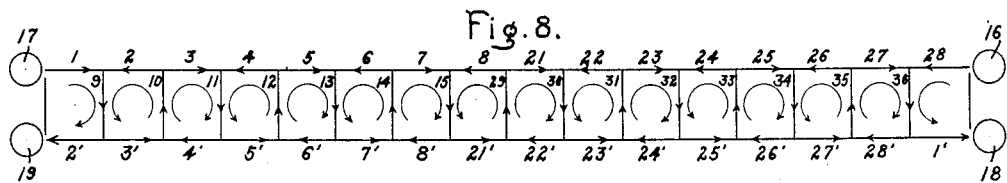
Figure 9:
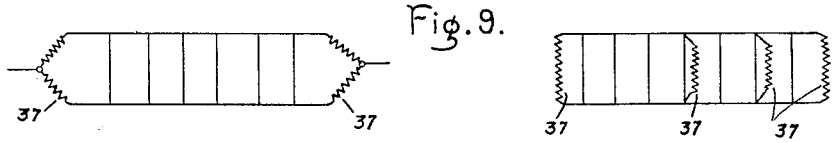

In the accompanying drawing and following description, I have illustrated and described in some detail the best embodiments of my invention of which I am now aware. Figure 1 shows a part of an armature winding adapted for either four or eight poles. Fig. 2 shows the directions of the electromotive forces in the various parts of the winding of Fig. 1 under the action of four poles. Fig. 3 shows the directions of the electromotive forces in the same winding under the action of eight poles. Fig. 4 is a section of a part of an armature showing a preferred arrangement of the wound conductors and active connecting conductors or lines. Fig. 5 shows a modification of the structure of Fig. 4. Fig. 6 shows a part of another armature winding having two circuits adapted for either four or eight poles. Fig. 7 shows the directions of the electromotive forces in the winding of Fig. 6 under the action of four poles. Fig. 8 shows the directions of the electromotive forces in the same winding under the action of eight poles. Fig. 9 indicates the use of resistances in the active connecting lines. In the drawing the same symbols represent the same parts.

There are two common types of windings for the secondaries of induction motors, which may be distinguished roughly as the wound secondary and the cage secondary. The wound secondary consists of a set of windings having a certain number of phases corresponding to the number of poles; its leading-out lines or terminals, which are led outward usually through slip rings, are joined through resistances or are connected to another electrical machine. The wound secondary has the advantage that the action of the secondary circuit may be changed by changing the characteristics of the secondary circuit in various ways. For example, with the wound secondary it is possible to change or adjust the torque of the motor by inserting and adjusting a resistance between the secondary slip rings, or the action of the motor may be changed in other ways, as by connecting in its secondary circuit a phase advancing machine, a speed changing machine, etc. However, the ordinary simple wound secondary has not only such disadvantages as complicated windings, difficulties of insulation and mechanical weakness, but also, from a practical point of view, its use is limited to a definite number of magnetic poles and consequently it is impossible to change the speed of the motor by changing the number of magnetic poles, and further it has a lower efficiency than the cage secondary when it is used continuously under full load and at full speed. On the other hand, the cage secondary besides being mechanically strong, simple in construction, safe in management, and enduring under rough usages, has the practical advantage that it may be operated without regard to the number of magnetic poles. However, speaking generally, in a cage secondary, the secondary circuit is perfectly definite and invariable and no change can be imposed upon it from outside; consequently, if a greater starting torque is required it is necessary to increase the resistance of the entire secondary, and this increased resistance is undesirable when working at full speed. At full speed the resistance of the entire secondary should be small. Therefore the cage secondary has the defect that the conditions for starting and for full speed operation are contradictory. Although the double cage secondary is sometimes used for increasing the starting torque, yet as the change is due entirely to the speed of the rotor, it is impossible to effect the change from outside as with the wound secondary. The thing that is desired in a single machine is both the ability to adjust the starting torque in any manner, that is by means of resistances or other machines, and the ability to change the speed by changing the number of magnetic poles. My invention combines the desirable characteristics of the wound secondary and the cage secondary to this end.

In the winding of my invention, two active circuits wound adjacent each other, are connected together by active connecting lines or conductors which are connected between points of equal potential and which are displaced in phase relation from the active circuits to which they are connected. Fig. 1 is an example of secondary circuits of my invention capable of operating with primaries of four and eight poles respectively. In this winding 1, 2, . . . 8 and 1′, 2′, . . . 8′ are conductors of two active circuits comprising a complete wound winding, and 9, 10, . . . 15 are the active connecting lines or conductors. The active circuits of the wound winding have such leading-out lines or terminals 16, 17, 18 and 19 as to allow parallel connections electrically, and the active connecting lines 9, 10, . . . 15, are connected between points of equal potential on the two active circuits (under four pole operation) as shown, and are displaced in phase relation from the conductors 1 to 8 and 1′ to 8′ of the two active circuits by 90 electrical degrees (under four pole operation), that is, are displaced such distances along the face of the machine part carrying the wound winding. Accordingly, when a four-pole magnetic field primary is employed, the conductors of the wound winding produce simultaneously currents in the same direction as shown in Fig. 2, but there is no current in the active connecting lines (by reason of electromotive forces in the active conductors) because these active connecting lines are connected between points on the wound winding which are of the same potentials. Also, since the active connecting lines are displaced 90 degrees from the active conductors of the wound winding, no voltage is induced in the connecting lines when the electromotive forces are largest in the wound winding. Consequently when there is maximum voltage induced in the wound winding, the two parallel circuits having the terminals 16, 17, 18 and 19, work as a wound secondary, and the connecting lines do not work at all but resemble voltage balancing lines. On the other hand, when the electromotive forces induced in the wound winding are zero, there are produced maximum electromotive forces in the active connecting lines, and as they are all in the same direction, as shown in Fig. 2, there can be no currents unless they are joined together by means of the leading-out lines 17—18 and 16—19. But in the case of polyphase windings, as the active connecting lines are joined together with the windings of other phases, the current in the same will flow through the other phases, and consequently the secondary will work as a sort of short circuited wound secondary, and the active connecting lines will work as active conductors which have a difference of phase of 90 degrees against the conductors of the wound winding. Accordingly if the wound windings are of three-phase, the active connecting lines are also of three-phase and will work as six-phase lines.

Preferably the active connecting lines or connecting conductors 9, 10, 11—15, are placed within deep grooves as shown in Figs. 4 and 5; these active connecting lines or conductors are placed in the bottoms of the grooves 20 and active conductors of a wound winding are placed above them in layers. It is immaterial whether the grooves 20 are common for all these conductors as shown in Fig. 4, or whether the connecting lines are placed alone in separate grooves 20′ as shown in Fig. 5.

For the reasons before indicated, the active circuits 1—8 and 1′—8′ work as a wound secondary and the active connecting conductors which connect these circuits work as a short-circuited wound secondary producing an action like a double cage secondary. Accordingly, not only may the starting torque be increased by the use of external resistance for the wound winding, but also the active connecting conductors can work as an effective secondary when the speed approaches to that of synchronism. Furthermore, if the number of magnetic poles is charged from four to eight, the position of the wound circuits 1 to 8 and 1′ to 8′ is such that its conductors come under poles of the same name (for instance north poles), and the position of the active connecting conductors 9 to 15 is such that all of these come under the other poles (for instance south poles). Hence the electromotive forces of the conductors 2, 4, 6, 8 and 2′, 4′, 6′, 8′ are reversed as shown in Fig. 3, and in the active connecting conductors 9 to 15 are induced electromotive forces of the same phase and of reverse direction in succession. Consequently there results a short-circuited circuit in each mesh and each of them changes into a short-circuited wound secondary as appears in Fig. 3.

It is apparent therefore that not only may the starting torque be increased but also the torque may be changed in any manner, whereby it is possible to start or adjust the speed of the motor with a smaller number of magnetic poles and also it is possible to run the motor in a most effective condition with a larger number of magnetic poles.

The present invention is not limited in its application to the simple wave-type windings heretofore described, but it may be applied to other windings, and the number of phases may also be chosen at will. Fig. 6 shows two circuits for operating with primaries of four poles and eight poles, in which 1, 2 . . . 8, 21 . . . 28 and 1', 2' . . . 8', 21' . . . 28' are conductors of the wound circuit or circuits and 9, 10 . . . 15, 29, 30 . . . 36 are active connecting lines or conductors. The operation of this winding is not different from that of the winding heretofore described, as appears from Figs. 7 and 8.

With my invention, resistances 37 may be inserted for adjusting the current in the connecting lines as shown in Fig. 9, and the same resistances may be adjustable.

What I claim as new and desire to secure by Letters Patent of the United States, is,—

1. In a dynamo-electric machine capable of operating with a field of either of two numbers of poles, a secondary winding adapted for use with either pole numbers, comprising a portion which consists of a complete wound winding for one of said two numbers of poles and another portion which consists of active connecting conductors connected between points of the first mentioned portion which are of equal potentials during operation with the last mentioned one of the two numbers of poles, said active connecting conductors being disposed at angles of ninety electrical degrees from the conductors of the first mentioned portion of the winding.

2. In a dynamo-electric machine capable of operating with a field of either of two numbers of poles, a secondary winding adapted for use with either pole numbers, comprising a portion which consists of two sets of conductors arranged in parallel and disposed as a complete wound winding for one of said two numbers of poles, and another portion which consists of active connecting conductors connected between the said two sets of parallel connected conductors of the wound winding.

3. In a dynamo-electric machine capable of operating with a field of either of two numbers of poles, a secondary winding adapted for use with either pole numbers, comprising a portion which consists of two sets of conductors arranged in parallel and disposed as a complete wound winding for one of said two numbers of poles, and another portion which consists of active connecting conductors connected between equipotential points of the said two sets of parallel connected conductors.

4. The combination of claim 1 further characterized by the active connecting conductors being disposed below active conductors of the complete wound portion.

5. In an induction motor capable of operating with a field of either of two numbers of poles, a secondary winding adapted for use with either pole numbers, comprising a wound portion responsive to the lower number of poles, and connections between equipotential points of said winding forming active conductors, whereby said winding operates as a short circuited secondary responsive to the higher number of poles.

In witness whereof, I have hereunto set my hand this thirtieth day of April, 1919.

TATSUICHIRO ISONO. [L. S.]